United States Patent [19]

Bovenkerk et al.

[11] 4,248,606
[45] Feb. 3, 1981

[54] SUPPORTED DIAMOND

[75] Inventors: Harold P. Bovenkerk, Worthington, Ohio; Robert C. DeVries, Burnt Hills, N.Y.

[73] Assignee: General Electric Company, Worthington, Ohio

[21] Appl. No.: 69,205

[22] Filed: Aug. 23, 1979

[51] Int. Cl.$^3$ .............................................. B24D 3/02
[52] U.S. Cl. ...................................... 51/307; 51/293; 51/308; 173/128; 423/446
[58] Field of Search ......................... 51/293, 307, 308; 423/445, 446; 72/462; 173/128

[56] References Cited

U.S. PATENT DOCUMENTS 4,181,505  1/1980  DeVries et al. ..................... 51/307

Primary Examiner—Donald J. Arnold
Assistant Examiner—W. Thompson
Attorney, Agent, or Firm—Douglas B. Little

[57] ABSTRACT

Compacts are provided in which one or more single crystal diamonds, having a largest dimension of at least one millimeter, are embedded in the polycrystalline matrix which may be made of diamond; cubic boron nitride (CNB); and silicon and silicon carbide bonded diamond, CBN, or mixtures of diamond and CBN. The single crystal diamond is from 10–90 volume percent of the compact.

The compacts (except for the silicon and silicon carbide variety) are made by high pressure-high temperature processing generally in the range of 50 Kbar at 1300° C. to 85 Kbar at 1750° C.

They have applications in several fields, for example, wire drawing die blanks, cutting tool blanks, and anvils for high pressure apparatus.

5 Claims, 4 Drawing Figures

SUPPORTED DIAMOND

TECHNICAL FIELD

This invention deals with a product which combines technology in the field of polycrystalline diamond (compacts) and single-crystal diamond. The product and manufacturing technique disclosed herein have several industrial and research applications.

One such application is the design of a punch or piston member of a high pressure apparatus which would be stronger than cemented tungsten carbide, and which is based on the use of polycrystalline diamond sintered together with cemented tungsten carbide. Other application areas are wire drawing dies, cutting tools, and optical windows.

BACKGROUND

A compact is a polycrystalline mass of abrasive particles (e.g., diamond and cubic boron nitride) bonded together to form an integral, tough, coherent, high-strength mass. Representative U.S. Pat. Nos. on the subject of diamond compacts are: 3,136,615 (boron carbide bonding medium); 3,141,746; 3,239,321 (graphite-free diamond compact); 3,744,982 (boron alloyed diamond compact process); 3,816,085; and 3,913,280. A composite compact is a compact bonded to a substrate material, such as cemented tungsten carbide (see U.S. Pat. No. 3,745,623). Representative U.S. Pat. Nos. on the subject of cubic boron nitride (CBN) compacts are: 3,233,988; 3,743,489 (aluminum alloy catalyst; 3,767,371 (composite) and 3,852,078 (uniform compacts of polycrystalline CBN with other hard materials, e.g., diamond). Compacts may be used as blanks for cutting tools, dressing tools and wear parts.

Compacts comprised of diamond, CBN, or combinations thereof bonded together with silicon and silicon carbide (silicon and silicon carbide bonded compacts) are described in U.S. Pat. application Ser. No. 954,289, filed Oct. 24, 1978, which is incorporated herein by reference. They are made by infiltrating a mixture of carbon coated abrasive (e.g., diamond) and a carbonaceous material with fluid silicon under partial vacuum. This operation can be performed in a graphite mold at temperature over 1400° C.

U.S. Pat. Nos. 3,831,428; 4,129,052 and 4,144,739 disclose wire drawing dies made from diamond or CBN. Cutting tools made with compacts are disclosed in U.S. Pat. No. 3,850,053. Wire drawing dies of single crystals of diamond fail by cleavage. Single crystal diamond tools most commonly fail by gross fracture. Single crystal diamond can be polished to a higher degree than polycrystalline diamond tools, however, and hence give a better finish on the workpiece.

Various high pressure-high temperature (HP/HT) apparatus have been designed for the synthesis of CBN and diamond for research purposes. The ultimate pressure cabability of a high pressure apparatus is dependent on the strength of materials, the geometry, the stress distribution and the stress support available. For example, a simple piston and cylinder apparatus is limited to an ultimate pressure of about 50 kilobars (Kbar) when the piston is cemented tungsten carbide. If the piston is tapered, such as in a Bridgman anvil, the strength is increased, by geometry effects, and a pressure of 100 Kbar or more can be achieved with the same material. If the Bridgman anvil is supported and/or pressure staged such as in a Drickamer or a Kendall apparatus, pressure of 300 Kbar can be reached.

The following references go into more detail on high pressure apparatus:

Spain, I. L., *High Pressure Technology*, Volume 1, Chapter 11, Marcel Dekker, Inc., New York, 1977.
U.S. Pat. No. 3,191,231 (refractory nib on a punch).
U.S. Pat. No. 3,079,505 (natural diamond anvils).
Vereshchagin, L. F., Yakovlev, et al., "Dielectric-to-Metal Transitions Under Pressure P IMb", *Proceedings of the Fourth International Conference on HIgh Pressure*, Kyoto, Japan, 1974, Published by The Physico-Chemical Society of Japan, Kyoto (1975).
Block & Piemarini, *Physics Today*, Sept. 1976.
Bundy, F. P., "Research at Very High Pressure and High Temperatures", *The Physics Teacher*, pp. 461-470 (November 1977).
U.S. Pat. No. 2,941,248.
Bundy, F. P., *Review of Scientific Instruments*, Vol. 46, No. 10, p. 1318 et.seq., (October 1975).

The term anvil will be used to refer to the analogous pressure producing members (punches, anvils, pistons) of the various high pressure apparatus discussed herein.

Bundy achieved pressures of more than 300 Kbar by replacing cemented carbide with sintered polycrystalline diamond, thereby reaching 500 or 600 Kbar in the Drickamer design. The Soviets (Vereshchagin) claim to have reached 1000 Kbar or more using polycrystalline diamond in a simple Bridgman anvil device.

The Spain reference mentions the Van Valkenburg apparatus in which samples were squeezed between two high quality single crystals of diamond. With modifications of Block and others, pressures up to 1000 Kbar have been claimed.

At a conference, June 2-4, 1976, on high pressure phenomena at Rensselaerville, New York, the importance of the diamond anvil cell (e.g., Van Valkengurg), in research at ultra-high pressures was discussed. The optical transparency of such devices permits laser heating in the reaction zone or cell, as well as precise optical observations and spectroscopic studies.

There are limitations, however, in all this prior work in that:
1. Large diamond crystals are rare, expensive, variable in quality, generally have residual stress, and have weak planes of cleavage;
2. Bundy had only a relatively thin layer of diamond, hence the cemented carbide back-up layer was the weakest element; and
3. No means for an optical path could be made through the Bundy, Kendall or the Russian designs.

Laser systems with diamond optical elements are described in U.S. Pat. No. 3,895,313.

DISCLOSURE OF INVENTION

The invention is summarized as a compact comprising one or more single crystal diamonds, having a largest dimension of at least one millimeter, embedded in a polycrystalline matrix selected from the group consisting of diamond; CBN; and silicon and silicon carbide bonded diamond, CBN, or mixtures of diamond and CBN, wherein single-crystal diamond comprises 10–90 volume percent of the compact.

The compact described above combines the properties of polycrystalline diamond and single-crystal diamond to utilize the best properties of each. A piece of natural ballas may be used in place of single-crystal diamond.

BEST MODE FOR CARRYING OUT THE INVENTION

Figure 1:
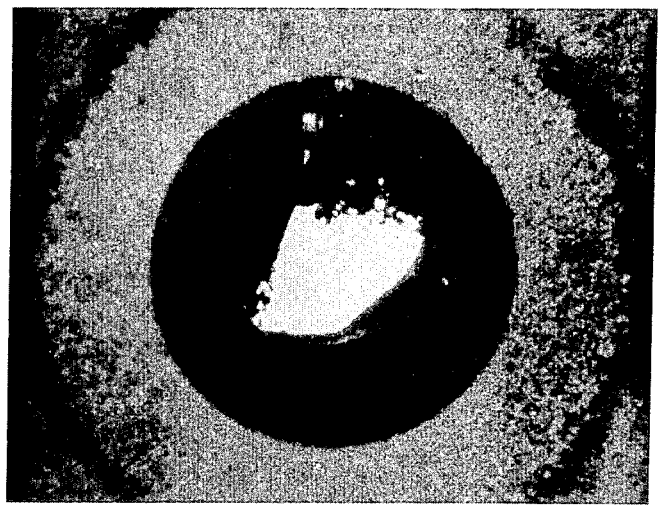
FIG. 1 is a photomicrograph (magnified about 17.5×) showing an embodiment of this invention, in which the transparency of the single-crystal diamond is quite apparent.
Figure 2:
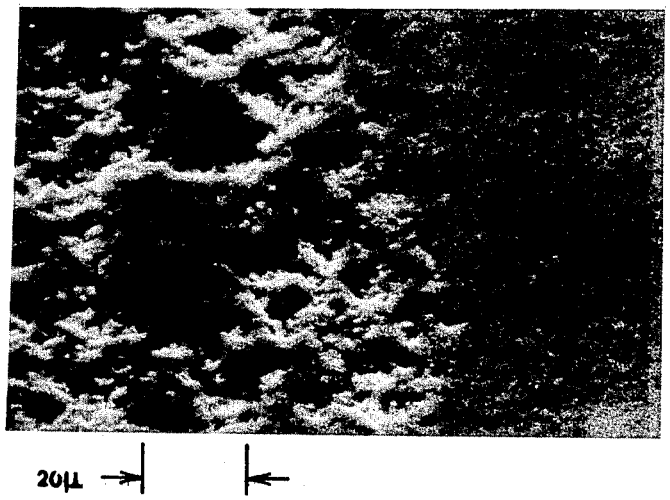
FIG. 2 is a photomicrograph (magnified 800×) which shows the bonding between the single crystal on the right and the polycrystalline matrix on the left.

One preferred form of a HP/HT apparatus in which the compacts of this invention may be prepared is the subject of U.S. Pat. No. 2,941,248 (incorporated herein by reference) which is called a belt apparatus. It includes a pair of opposed cemented tungsten carbide punches and an intermediate belt or die member of the same material. The die member includes an aperture in which there is positioned a reaction vessel shaped to contain a charge assembly. Between each punch and the die there is a gasket assembly comprising a pair of thermally insulating and electrically nonconducting pyrophyllite members and an intermediate metallic gasket.

The reaction vessel, in one preferred form, includes a hollow salt cylinder. The cylinder may be of another material, such as talc, which (a) is not converted during HP/HT operation to a stronger, stiffer state (as by phase transformation and/or compaction) and (b) is substantially free of volume discontinuities occuring under the application of high temperatures and pressures, as occurs, for example with pyrophyllite and porous alumina. Materials meeting other criteria set forth in U.S. Pat. No. 3,030,662 (Col. 1, 1.59-Col. 2, 1.2, incorporated by reference) are useful for preparing the cylinder.

Positioned concentrically within and adjacent to the cylinder is a graphite electrical resistance heater tube. Within the graphite heater tube, there is concentrically positioned a cylindrical salt liner. The ends of the liner are fitted with salt plugs disposed at the top and the bottom.

Electrically conductive metal end discs are utilized at each end of the cylinder to provide electrical connection to the graphite heater tube. Adjacent to each disc is an end cap assembly each of which comprises a pyrophyllite plug or disc surrounded by an electrically conducting ring.

Operational techniques for simultaneously applying both high pressures and high temperatures in this type of apparatus are well known to those skilled in the super-pressure art. The charge assembly fits within the space defined by the salt liner and the salt plugs. The assembly consists of a cylindrical sleeve of shield metal selected from the group consisting of zirconium, titanium, tantalum, tungsten and molybdenum. Within the shield metal sleeve is a sub-assembly confined within a shield metal disc and a shield metal cup. A mass of abrasive grains (diamond, CBN or mixtures thereof) is disposed within the cavity defined by the cup and the disc. This mass may also contain graphite and/or a metal catalyst. The single-crystal diamond is embedded in the center of the mass of abrasive grains. If a wire drawing type die is desired, the inner mass of abrasive grains is disposed within an annulus made of cold pressed sinterable carbide powder (mixture of carbide powder and appropriate metal bonding medium therefor). If desired, the annulus may be made of presintered metal bonded carbide or fully sintered metal bonded carbide.

The balance of the volume in the charge assembly is taken up with a disc made of the same material as the salt cylinder (e.g., sodium chloride) and discs made of hexagonal boron nitride to minimize the entry of undesirable substances into the sub-assembly defined by the shield metal disc and cup.

The conditions for the HP/HT process are:

For a diamond matrix:
  Diamond particles having a largest dimension of 0.1–500 microns;
  Pressure of at least 50 Kbar at a temperature of at least 1300° C. and within the diamond stable region; and
  A reaction time of three to 60 minutes. For CBN matrix;
  CBN particles having a largest dimension of 0.1–20 microns;
  Pressure of at least 45 Kbar at a temperature of at least 1300° C. and within the cubic boron nitride stable region; and
  A reaction time of two to 60 minutes.

The charge assembly is loaded into the reaction vessel which is placed in the HP/HT belt apparatus. First, the pressure and then the temperature are increased and held at the desired conditions for sufficient time for sintering to occur. The sample is then allowed to cool under pressure for a short period of time, and finally the pressure is decreased to atmospheric pressure, and the compact is recovered.

The shield metal sleeve can be manually removed. Any adhering metal from the shield metal cup or disc can be ground or lapped off. Distortion or surface irregularity may be removed in the same manner.

Two wire die blank type compacts with large single crystals of natural diamond contained in a polycrystalline mass of synthetic diamond have been made according to the process described above (at about 65 Kbar and 1400° C. to 1500° C.). One of them is depicted in FIG. 1. This compact was ground and lapped on both sides.

Figure 3:
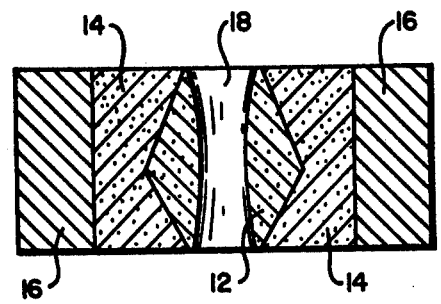
FIG. 3 represents a wire drawing die, in section.

A sectional view of such a die blank is depicted in FIG. 3. The single crystal diamond 12 is embedded in polycrystalline diamond matrix 14 which is sintered within and bonded to cobalt cemented tungsten carbide annulus 16. The double tapered wire drawing hole 18 could be made through the center of the die blank core using a laser. The hole would then be finished by drawing a wire impregnated with diamond dust back and forth through the hole.

The single crystal diamond need not extend completely through the die. It may be smaller, occupying only the bearing area (smallest diameter of the die hole) in which the wire is calibrated to the required diameter. The bearing area occupies approximately the middle portion of the die hole. The entrance zone, reduction zone (which deforms the wire) and the exit zone (back relief) may be made of polycrystalline matrix material.

Fine cracks have occurred in some of the compacts made according to this invention. Additional work indicates that this cracking occurs during the initial cold compression of the sample to about 65 Kbar. The damage is caused by unequal stresses applied to crystal surfaces during the compact synthesis. The stresses arise from the irregular contact of the diamond crystals with each other which result in intensification of the stresses at contact points between the diamond surfaces. Also, non-homogeneous pressure distribution within the pressure vessel may contribute to the damage.

Such damage is minimized by isolating the relatively incompressible diamond crystals in a relatively compressible matrix before exposing the sample to HP/HT sintering conditions. This matrix could be a compressible form of carbon which would conform to the diamond crystal shapes and distribute the stresses evenly to the crystals. A number of ways to do this are:

1. Mixing diamond crystals with graphite or amorphous carbon powders;
2. Mixing diamond crystals with a mixture of diamond and graphite or amorphous carbon powders (filler materials such as tungsten carbide, $Si_3N_4$, SiC may be added to the carbon powders);
3. Forming isolated compartments in a graphite block for each diamond crystal; and
4. A combination of 1, 2 and 3.

The diamond plus carbon matrix is placed in a suitable high pressure device which can obtain diamond synthesis conditions. The graphite or amorphous carbon could be converted to diamond during sintering and, thus, introducing diamond-to-diamond bonding throughout the compact. A catalyst would normally be present to promote the conversion of the non-diamond carbon to diamond. Suitable catalysts are iron, nickel or cobalt, or alloys of these metals with each other or other elements.

Indications are that the pieces of the cracked crystals grow back together again with some residual metal. Hence, the cracking is not extremely detrimental.

It was also found that cracking developed in the wire die type compacts during polishing. This was prevented by pressing the compacts into a steel ring after recovering them from the mold and prior to polishing for transparency.

INDUSTRIAL APPLICABILITY

The compact of this invention has application in opposed anvil, high pressure devices (e.g., Drickamer and Van Valkenburg). If these compacts were used as the tips of the anvils or pistons, previous design limitations would be overcome by:

1. Replacing large diamond crystals with sintered polycrystalline diamond;
2. Having a thick layer of diamond with good radial support; and
3. Providing, as an option in the design, an optical path through the high reaction zone of the apparatus.

Figure 4:
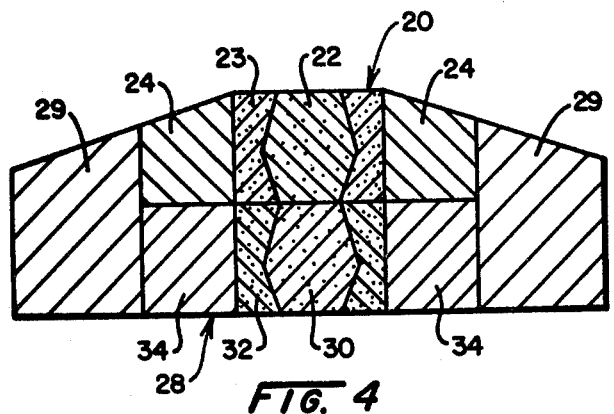
FIG. 4 represents a piston of a Bridgman Anvil apparatus, in section.

Diamond blanks could be fabricated (similar to wire drawing die blanks) by grinding to the desired form and inserting (by press fitting) into cemented carbide outer rings. These structures could be put in series, as shown in FIG. 4, which represents a Bridgman anvil shown in section. The anvil comprises two compacts 20 and 28 press fitted into tungsten carbide ring 29. The upper compact 20 is tapered to function properly in the piston and comprises single crystal diamond 22 embedded in polycrystalline diamond matrix 23, all of which is sintered to tungsten carbide annulus 24. The flat lower compact 28 (which supports the upper compact) comprises single crystal diamond 30 embedded within diamond matrix 32 all of which is sintered within tungsten carbide annulus 34. If the large single crystals are ground, an optical path can be provided through them. If made in this way, the composite structure should be stronger than either the Van Valkenburg design or the Bundy design, since the single crystal of diamond is stress supported or pre-stressed in compression, and the diamond layer is thicker than previously used.

If an optical path is unnecessary, the single crystal diamond need not extend completely through the compact. It could be smaller, less costly single crystal, surrounded by polycrystalline matrix.

Other uses for this concept (besides high pressure apparatus and wire dies) are:

1. As cutting tool inserts which could be made with a large single crystal embedded in the polycrystalline abrasive section. This single crystal would make possible a cleaner cutting edge with capability of making finer finishes in cutting with the advantages of a stronger, more impact resistance tool; and
2. As optical windows, such as those described in U.S. Pat. No. 3,895,313.

Compacts having a single diamond are best for application in anvils and wire die blanks. Those which are transparent and have more than one single crystal are suitable for laser windows.

The diamond stable region is the range of pressure temperature conditions under which diamond is thermodynamically stable. On a pressure-temperature phase diagram, it is generally the high pressure side, above the equilibrium line between diamond and graphite.

The cubic boron nitride stable region is the range of pressure temperature conditions under which cubic boron nitride is thermodynamically stable. On a pressure-temperature phase diagram, it is generally the high pressure side, above the equilibrium line between cubic boron nitride and hexagonal boron nitride.

Other embodiments of this invention will be apparent to those skilled in the art from a consideration of this specification or practice of the invention disclosed herein. It is not intended that the invention be limited to the disclosed embodiments or to the details thereof, and departures may be made therefrom within the spirit and scope of the invention as defined in the following claims.

We claim:

1. A compact comprising one or more single crystal diamonds, having a largest dimension of at least one millimeter, embedded in a polycrystalline matrix selected from the group consisting of diamond; cubic boron nitride; and silicon and silicon carbide bonded diamond, or mixtures of diamond and cubic boron nitride, wherein single crystal diamond comprises 10-90 volume percent of the compact and wherein there is diamond to diamond crystal bonding between the single crystal diamonds and the matrix when the matrix material includes diamond.

2. The compact recited in claim 1 wherein the polycrystalline matrix is diamond.

3. The compact of claim 1 which has an optical path through the single crystal diamond.

4. The compact recited in claim 1 wherein only one single crystal diamond has been embedded in the polycrystalline matrix.

5. An improved high pressure apparatus wherein the improvement comprises an anvil made from the compact of claim 4.

* * * * *